(12) United States Patent
Bao et al.

(10) Patent No.: US 8,472,950 B2
(45) Date of Patent: Jun. 25, 2013

(54) LOCATION-BASED MICROCELL SEARCH

(75) Inventors: Derek Hongwei H. Bao, Concord, CA (US); Steven R. Rados, Danville, CA (US); Patricia Ruey-Jane Chang, San Ramon, CA (US); Priscilla Lau, Fremont, CA (US); Yee Sin Chan, San Jose, CA (US); Maria G. Lam, Oakland, CA (US); John F. Macias, Antelope, CA (US); Thomas H. Tan, San Jose, CA (US); Lalit R. Kotecha, San Ramon, CA (US); Thomas W. Haynes, San Ramon, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/289,588

(22) Filed: Nov. 4, 2011

(65) Prior Publication Data

US 2013/0115943 A1 May 9, 2013

(51) Int. Cl.
*H04W 4/00* (2009.01)
(52) U.S. Cl.
USPC ............... 455/434; 455/552.1; 455/456.1

(58) Field of Classification Search
USPC ............. 455/404.2, 414.1, 418–420, 434, 455/436–444, 456.1–457
See application file for complete search history.

(56) References Cited

U.S. PATENT DOCUMENTS

| 2006/0063560 | A1* | 3/2006 | Herle | 455/552.1 |
|---|---|---|---|---|
| 2008/0247344 | A1* | 10/2008 | Bahl et al. | 370/310 |
| 2009/0047982 | A1* | 2/2009 | Shi et al. | 455/466 |
| 2009/0168676 | A1* | 7/2009 | Olson | 370/311 |
| 2011/0103318 | A1* | 5/2011 | Ekici et al. | 370/329 |
| 2011/0151864 | A1* | 6/2011 | Byun et al. | 455/426.1 |
| 2011/0238779 | A1* | 9/2011 | Little et al. | 709/217 |
| 2012/0252571 | A1* | 10/2012 | Shi et al. | 463/29 |

* cited by examiner

*Primary Examiner* — Kashif Siddiqui

(57) ABSTRACT

A network device may store information identifying a coverage area associated with each of one or more cells that are associated with the network device. The network device may receive information identifying a geographic location of a user device. The network device may compare the geographic location of the user device to one or more of the stored coverage areas. The network device may also determine, based on the comparing, that the user device is within a particular coverage area of a particular cell, of the one or more cells. The network device may further send, to the user device, and based on determining that the user device is located within the particular coverage area of the particular cell, an instruction for the user device to connect to the particular cell, where the user device is to attempt to connect to the particular cell in response to the instruction.

19 Claims, 11 Drawing Sheets

600

| Technology 605 | Cell ID 610 | Location 615 | Radius/ shape 620 | Altitude 625 | Band 630 |
|---|---|---|---|---|---|
| LTE | 510 | +40.689060, -74.044636 | Circle with 3-km radius | 50m | 900 MHz |
| Wi-fi | 515 | +40.689159, -74.054727 | Rectangle with vertices p1, p2, p3, and p4 | 15m | 5 GHz |
| EVDO | 520 | +40.689048, -74.123456 | Triangle with vertices p5, p6, and p7 | -25m | 1900 MHz |
| 1X | 525 | +40.00001, -74.998293 | Vertices p8, p9, p10, p11, and p12 | 30m | 1900 MHz |
| LTE | 530 | +39.893612, -74.100234 | Circle with 100-meter radius | 33m | 1900 MHz |
| ⋮ | ⋮ | ⋮ | ⋮ | ⋮ | ⋮ |

FIG. 6

LOCATION-BASED MICROCELL SEARCH

BACKGROUND

Cellular service providers may provide many different cellular technologies at any given time. In order to provide these technologies, cellular providers may provide one or more RANs ("RANs"), that include cells, to which cellular telephones may wirelessly connect. The cells within a RAN may include cells that correspond to different cellular technologies, and thus may correspond to two or more different frequency ranges (or "bands"). The two or more different bands may offer different trade-offs in utility. Namely, a lower band (e.g., a 700 MHz band, which may include a frequency range of approximately 698-806 MHz) may provide broad coverage (e.g., several square miles), but may provide low bandwidth. A higher band (e.g., an AWS band, which may include a frequency range of approximately 1710-1755 and/or 2110-2155 MHz) may provide less coverage than a low band, but higher bandwidth than the low band.

A cell that corresponds to a lower band may be referred to as a "macrocell," while a cell that corresponds to a higher band may be referred to as a "microcell," "picocell," "femtocell," etc. (herein collectively referred to as "microcells" or a "microcell"). In order to connect to the various cells of a RAN, a cellular telephone typically continuously searches for cells that correspond to these various technologies (and/or bands). For example, at any given time, a cellular telephone may be searching for cells that correspond to two or more different bands (e.g., a 700 MHz band, an 800 MHz band, an AWS band, etc.). A cellular telephone may be in range (e.g., within a coverage area) of a macrocell of a RAN, but may be significantly out of range of any microcells that correspond to other bands. Thus, searching for microcells that correspond to the other bands needlessly wastes battery life of the cellular telephone, since the cellular telephone is out of range of the microcells that correspond to the other bands.

BRIEF DESCRIPTION OF THE DRAWINGS

FIG. 6 is a diagram of an example data structure that may be stored by a base station;

DETAILED DESCRIPTION OF PREFERRED EMBODIMENTS

The following detailed description refers to the accompanying drawings. The same reference numbers in different drawings may identify the same or similar elements.

As used herein, a "cell" may include one or more devices, via which a user device (e.g., a cellular telephone) may connect to a RAN ("RAN"). For instance, a cell may include a transceiver that transmits and receives radio signals according to a particular frequency and/or a particular band. A "band" may refer to a range of frequencies, with which a cell may be associated.

A "macrocell" may include a cell, of a RAN, that corresponds to a particular frequency and/or band. A "microcell" may include a cell, of the RAN, that corresponds to a frequency and/or band that is higher than the frequency and/or band associated with the macrocell. A macrocell may be associated with one or more microcells, where the coverage areas of the microcells are located within a coverage area of the macrocell. The terms "macrocell" and "microcell" are not used herein to specify a particular frequency and/or band. Rather, when these terms are used in the same example, they are used as relative terms. Additionally, the term "microcell," as used herein, may include other higher-band cells, such as picocells, femtocells, and the like.

A system and/or method, described herein, may enable a user device (e.g., a cellular telephone, a personal digital assistant ("PDA"), a tablet computer, a laptop computer, etc.) to search for microcells of a RAN when the user device is in range (e.g., within a coverage area) of the microcells. The user device may include a feature whereby the user device does not search for microcells unless the user device is in a known coverage area of the microcells.

Figure 1A:
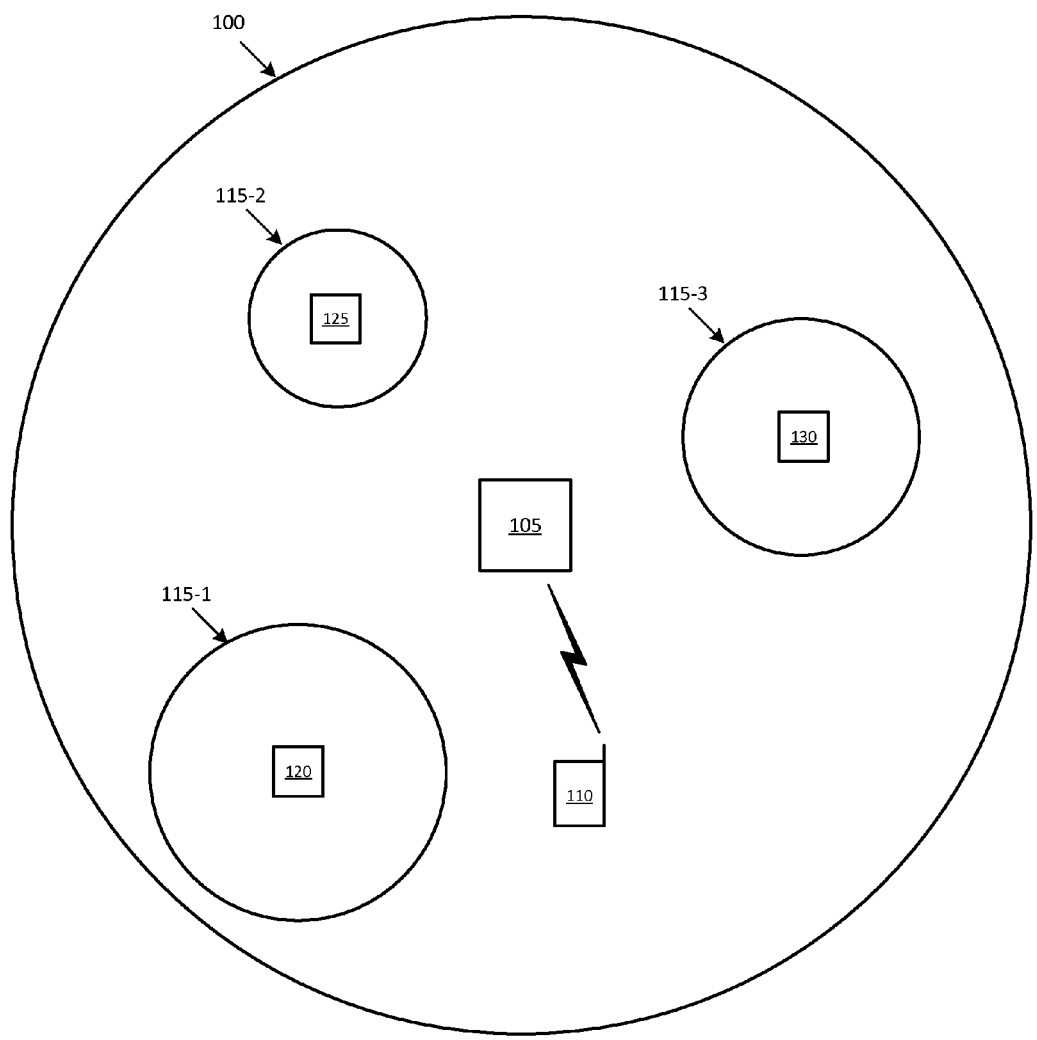
FIGS. 1A and 1B illustrate an overview of an example implementation described herein.
Figure 1B:
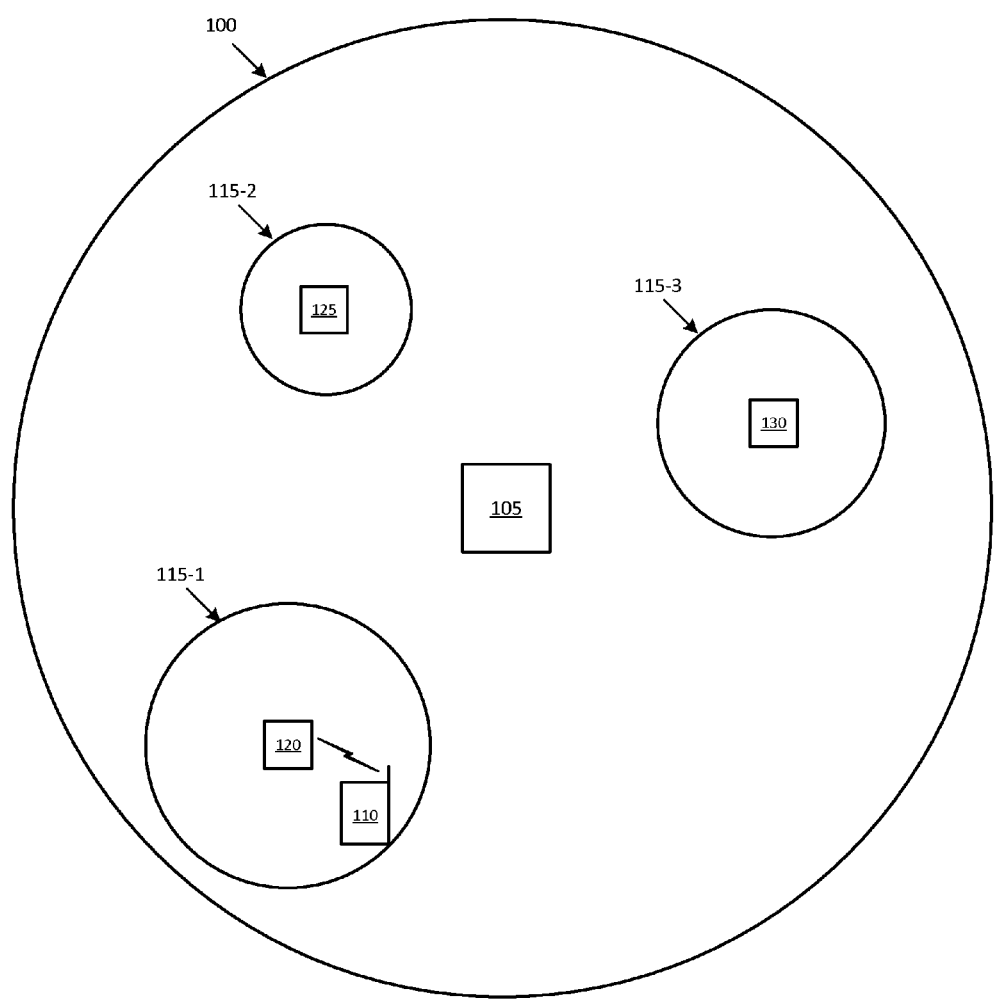

FIGS. 1A and 1B illustrate an example implementation described herein. For example, a user device (e.g., user device 110) may be located within cell 100 (e.g., a macrocell) of a RAN. User device 110 may periodically inform a base station (e.g., base station 105), with which the cell is associated, of the location of user device 110. Base station 105 may store a data structure that identifies a list of cells (including one or more macrocells and/or one or more microcells) associated with base station 105. The data structure may also specify location(s) and/or coverage area(s) of the cells associated with base station 105. The identified cells may include, for example, microcells 115-1, 115-2, and 115-3, which are within macrocell 100. Each of microcells 115-1 through 115-3 may be associated with a respective access point 120-130. Each access point may include a wireless transceiver, with which user device 110 may be capable of wirelessly communicating.

As shown in FIG. 1A, user device 110 may be in range of base station 105 (e.g., within cell 100), but not within range of any of access points 120-130 (e.g., not within any of cells 115-1 through 115-3). Since user device 110 is not within any of microcells 115-1 through 115-3, user device 110 may not search for one or more of microcells 115-1 through 115-3. Further, user device 110 may place one or more transceivers, associated with technologies and/or bands associated with microcells 115-1 through 115-3, in a low-power or no-power (e.g., "off") state. User device 110 may periodically send location updates to base station 105, and/or may monitor its own location.

As shown in FIG. 1B, assume that user device 110 moves to be in range of access point 120 (e.g., may have entered microcell 115-1). According to one implementation, user device 110 may send a periodic update of the location of user device 110, thus notifying base station 105 that user device has entered cell 115-1. Upon receiving this location update, base station 105 may identify that the user device has entered microcell 115-1. Base station 105 may then send a message that informs user device 110 that user device 110 is in range of microcell 115-1. The message may identify the technology, frequency, and/or band associated with microcell 115-1. User device 110 may enable a transceiver associated with the technology, frequency, and/or band, and perform a search for the microcell 115-1 (e.g., by sending out a beacon), using the identified technology, frequency, and/or band. User device 110 may then connect to the microcell 115-1, and base station 105 may be notified that the connection to microcell 115-1 has occurred.

Additionally, or alternatively, user device 110 may receive a data structure that identifies a list of cells associated with a base station (e.g., that identifies microcells 115-1 through 115-3). The data structure may also specify location(s) and/or coverage area(s) of microcells 115-1 through 115-3. User device 110 may receive the data from base station 105, and/or from any other source. User device 110 may periodically determine its own location, and compare its determined location to the location(s) and/or coverage area(s) associated with the microcells identified by the data structure.

When entering a cell identified by the data structure (e.g., microcell 115-1), user device 110 may identify, based on monitoring its own location, that user device 110 has entered cell 115-1. User device 110 may also determine, based on the data structure, the technology, frequency, and/or band associated with microcell 115-1. User device 110 may enable a transceiver associated with the technology, frequency, and/or band, and perform a search for the microcell 115-1 (e.g., by sending out a beacon), using the identified technology, frequency, and/or band. User device 110 may then connect to the microcell 115-1, and base station 105 may be notified that the connection to microcell 115-1 has occurred.

Thus, a user device may forego searching for microcells, unless the user device is in a location that is known to be in a coverage area of a microcell. By not searching for microcells until the user device is in range of microcells, the user device is able to save battery life that would be expended by the continuous searching for microcells. Additionally, the user device causes less wireless interference, as the user device is not constantly searching (e.g., sending beacons) for micro cells.

Figure 2:
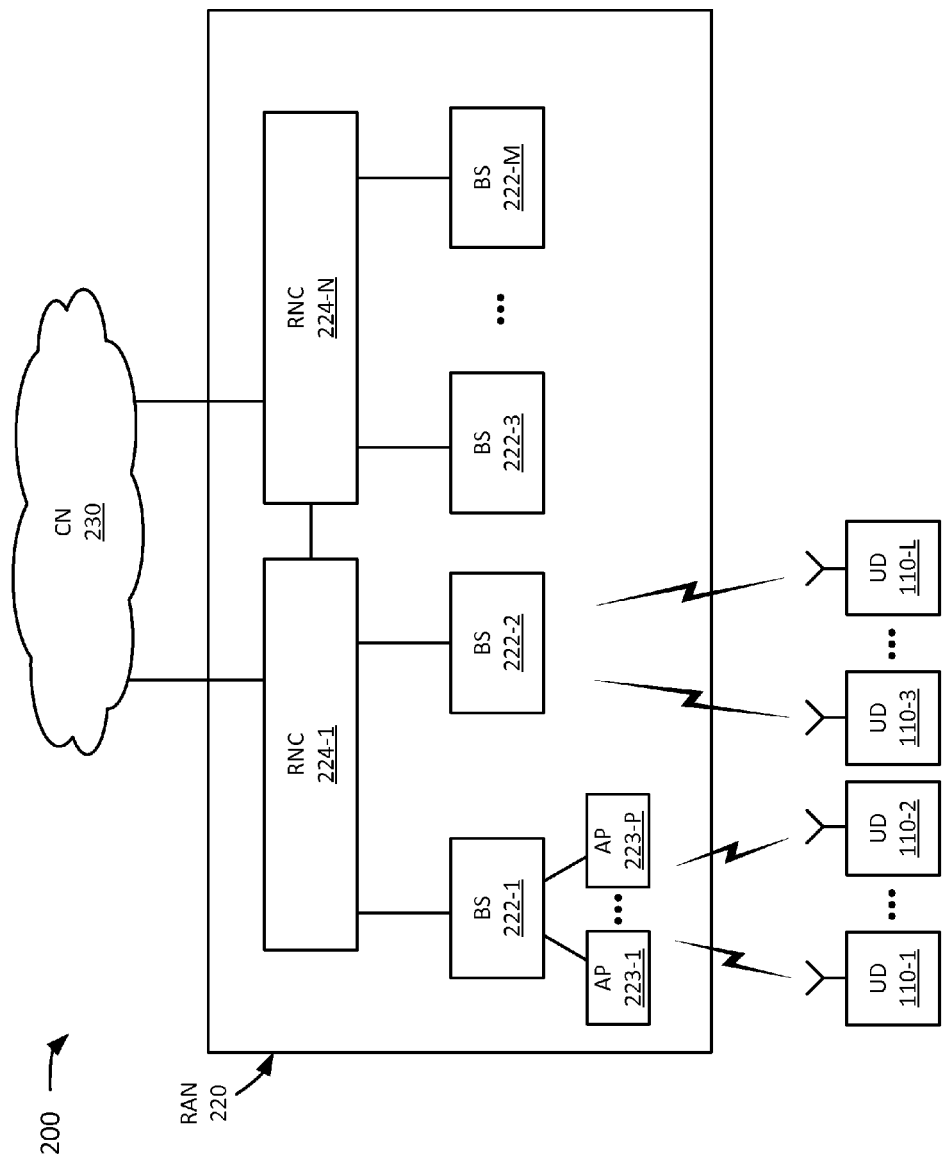
FIG. 2 is a diagram of an example network in which systems and/or methods, described herein, may be implemented.

FIG. 2 depicts a diagram of an example network 200 in which systems and/or methods described herein may be implemented. As shown, network 200 may include a group of user devices 110-1 through 110-L (where L is an integer that is greater than or equal to 1) (referred to collectively as "user devices 110," and in some instances individually, as "user device 110"), a RAN 220, and a core network ("CN") 230. Four user devices 110, a single RAN 220, and a single core network 230 have been illustrated in FIG. 2 for simplicity. In practice, additional user devices 110, RANs 220, and/or core networks 230 may be used. Also, in some instances, a component in network 200 (e.g., one or more of user device 110, RAN 220, and core network 230) may perform one or more functions described as being performed by another component or group of components in network 200.

User device 110 may include one or more devices capable of sending/receiving voice and/or data to/from RAN 220. User device 110 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, etc.

RAN 220 may include one or more devices for transmitting voice and/or data to user device 110 and core network 230. As illustrated in FIG. 2, RAN 220 may include a group of base stations 222-1 through 222-M (where M is an integer that is greater than or equal to 1) (referred to collectively as "base stations 222" and in some instances, individually as "base station 222"), a group of access points 223-1 through 223-P (where P is an integer that is greater than or equal to 1) (referred to collectively as "access points 223" and in some instances, individually as "access point 223"), and a group of radio network controllers ("RNCs") 224-1 through 224-N (where N is an integer that is greater than or equal to 1) (referred to collectively as "radio network controllers 224" and in some instances, individually as "radio network controller 224"). Four base stations 222 and two RNCs 224 are shown in FIG. 2 for simplicity. In practice, there may be additional or fewer base stations 222 and/or RNCs 224. Also, in some instances, a component in RAN 220 (e.g., one or more of base stations 222 and RNCs 224) may perform one or more functions described as being performed by another component or group of components in RAN 220.

RAN 220 may include a long term evolution ("LTE") network. In such an example, base stations 222 may take the form of evolved node Bs ("eNBs"), and RNCs 224 may take the form of mobile management entities ("MMEs").

Base stations 222 may include one or more network devices that receive voice and/or data from RNCs 224 and transmit that voice and/or data to/from user devices 110 via an air interface (e.g., via one or more wireless transceivers associated with base stations 222). Base stations 222 may also include one or more network devices that receive voice and/or data from user devices 110 over an air interface and transmit that voice and/or data to RNCs 224 or other user devices 110.

Base stations 222 may further transmit voice and/or data to/from user devices 110 via access points 223. Access points 223 may include one or more devices that are communicatively coupled to base station 222 and one or more user devices 110. Access point 223 may include a direct connection to base station 222 (e.g., a hardwired connection, a connection that does not traverse an outside network, etc.). Additionally, or alternatively, access point 223 may include an indirect connection to base station 222. For example, access point 223 may communicate with base station 222 through one or more networks (e.g., through core network 230, the Internet, etc.).

Access point 223 may be coupled to user device 110 via a wireless interface. For instance, access point 223 may include one or more transceivers that send and/or receive voice and/or data to and/or from user devices 110. As described below with respect to FIG. 5, each access point 223 may be associated with a particular cell (e.g. a microcell), while each base station 222 may also be associated with a particular cell (e.g., a macrocell).

Access point 223 may receive voice and/or data from user devices 110, and provide the voice and/or data to base station 222, to which access point 223 is directly and/or indirectly connected. Access point 223 may also receive voice and/or data from base station 222, to which access point 223 is directly and/or indirectly connected, and provide the voice and/or data to radio user devices 110.

Access points 223-1 through 223-P, which are associated with base station 222-1 in the example shown in FIG. 2, may include cells that are associated with multiple bands. For example, access point 223-1 may be associated with a first band (e.g., a 700 MHz band), while access point 223-2 (not pictured) may be associated with a second band (e.g., an AWS band), while access point 223-P may be associated with yet a third band (e.g., a 5 GHz band). Additionally, or alternatively, multiple access points 223, associated with the same base station 222-1, may be associated with the same band. For example, further to the example above, another access point 223-3 (not pictured), associated with base station 222-1, may also be associated with an AWS band.

Access points 223 that are associated with the same band may be associated with (e.g., send and/or receive voice and/or data at) the same frequency or range of frequencies. For instance, two access points 223 that are associated with an AWS band may both be associated with the entire frequency range of the AWS band. Additionally, or alternatively, two access points 223 that are associated with an AWS band may both be associated with a particular subset of (e.g., a frequency range that is within) the AWS band. Additionally, or alternatively, two access points 223 that are associated with an AWS band may both be associated with a single frequency, or a finite quantity of frequencies, within the AWS band.

Access points 223 that are associated with the same band may also be associated with different frequencies or ranges of frequencies. For instance, one access point 223 that is associated with an AWS band may be associated with a first subset of the AWS band, while another access point 223 that is also associated with the AWS band may be associated with a different second subset of the AWS band. The second subset of the AWS band may overlap with the first subset (e.g., one or more of the frequencies in the second subset may be the same as frequencies in the first subset, while other frequencies in the second subset may not be included in the first subset).

While FIG. 2 only illustrates access points 223-1 through 223-P, associated with base station 222-1, other base stations 222 may also be associated with access points 223. However, these other base stations have not been illustrated in FIG. 2, for the purposes of clarity and ease of explanation.

RNCs 224 may include one or more devices that control and manage base stations 222. Radio network controllers 224 may also include devices that perform data processing to manage utilization of radio network services. RNCs 224 may transmit/receive voice and data to/from base stations 222, other radio network controllers 224, and/or core network 230.

RNC 224 may act as a controlling radio network controller ("CRNC"), a drift radio network controller ("DRNC"), and/or a serving radio network controller ("SRNC"). A CRNC may be responsible for controlling the resources of a base station 222. A SRNC may serve particular user device 110 and may manage connections towards that user device 110. A DRNC may fulfill a similar role to the SRNC (e.g., may route traffic between a SRNC and user device 110).

CN 230 may include one or more devices that transfer/receive voice and/or data to a circuit-switched and/or packet-switched network. In one embodiment, core network 230 may include, for example, a Mobile Switching Center ("MSC"), a Gateway MSC ("GMSC"), a Media Gateway ("MGW"), a Serving General Packet Radio Service ("GPRS") Support Node ("SGSN"), a Gateway GPRS Support Node ("GGSN"), and/or other devices.

Figure 3:
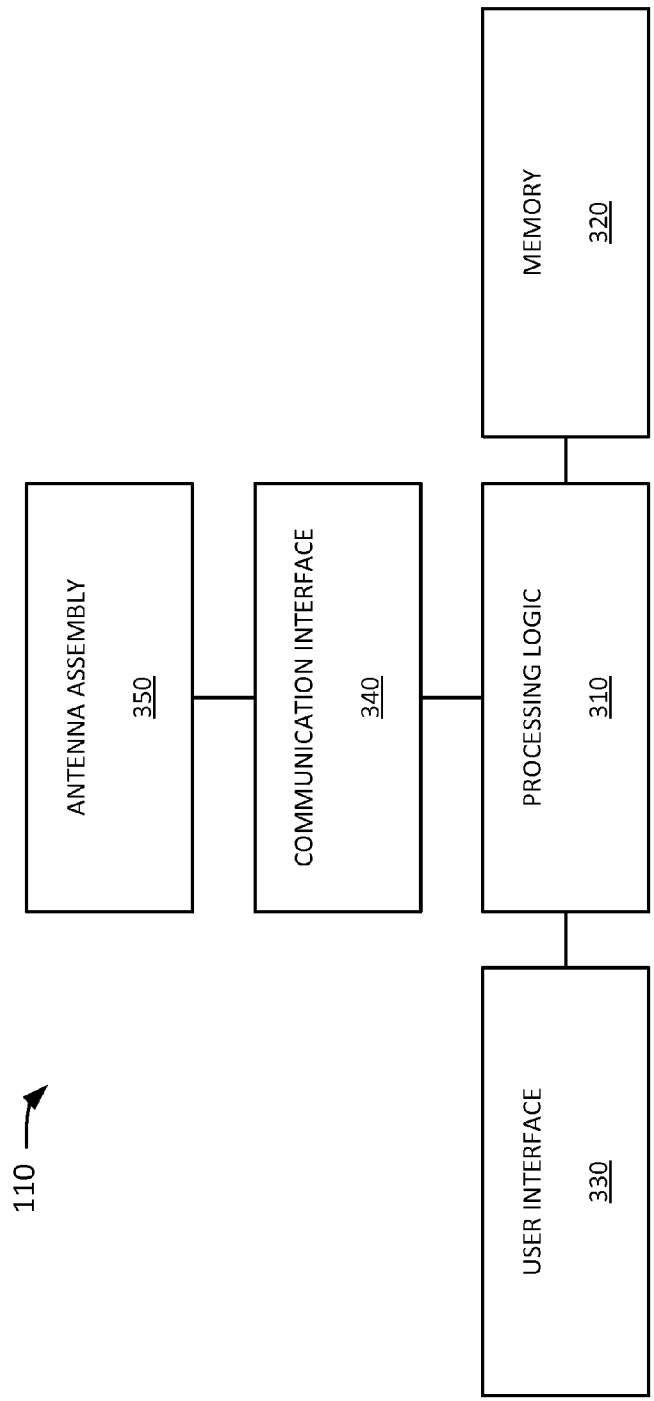
FIG. 3 is a diagram of example components of one or more user devices shown in FIG. 2.

FIG. 3 is a diagram of example components of user device 110. As shown in FIG. 3, user device 110 may include processing logic 310, memory 320, user interface 330, a communication interface 340, and/or an antenna assembly 350. Processing logic 310 may include a processor, microprocessor, an application specific integrated circuit ("ASIC"), field programmable gate array ("FPGA"), or the like. Processing logic 310 may control operation of user device 110 and its components. Memory 320 may include a random access memory ("RAM"), a read only memory ("ROM"), and/or another type of memory to store data and instructions that may be used by processing logic 310.

User interface 330 may include mechanisms for inputting information to user device 110 and/or for outputting information from user device 110. Examples of input and output mechanisms might include buttons (e.g., control buttons, keys of a keypad, a joystick, etc.) to permit data and control commands to be input into user device 110 (e.g., text input into user device 110); an audio output device (e.g., a speaker) to receive electrical signals and output audio signals; an audio input device (e.g., a microphone) to receive audio signals and output electrical signals; a visual output device (e.g., a display) to output visual information; and/or a vibrator to cause user device 110 to vibrate.

Communication interface 340 may include, for example, a transmitter that may convert baseband signals from processing logic 310 to radio frequency ("RF") signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit the RF signals over the air, and receive RF signals over the air and provide the RF signals to communication interface 340. In one embodiment, for example, communication interface 340 may communicate with a network, such as RAN 220.

As will be described in detail below, user device 110 may perform certain operations in response to processing logic 310 executing software instructions of an application stored in a computer-readable medium, such as memory 320. A computer-readable medium may be defined as a non-transitory memory device. A memory device may include space within a single physical memory device or spread across multiple physical memory devices. The software instructions may be read into memory 320 from another computer-readable medium or from another device. The software instructions stored in memory 320 may cause processing logic 310 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of user device 110, in other implementations, user device 110 may include fewer, different, or additional components than depicted in FIG. 3. In still other implementations, one or more components of user device 110 may perform the tasks performed by one or more other components of user device 110

Figure 4:
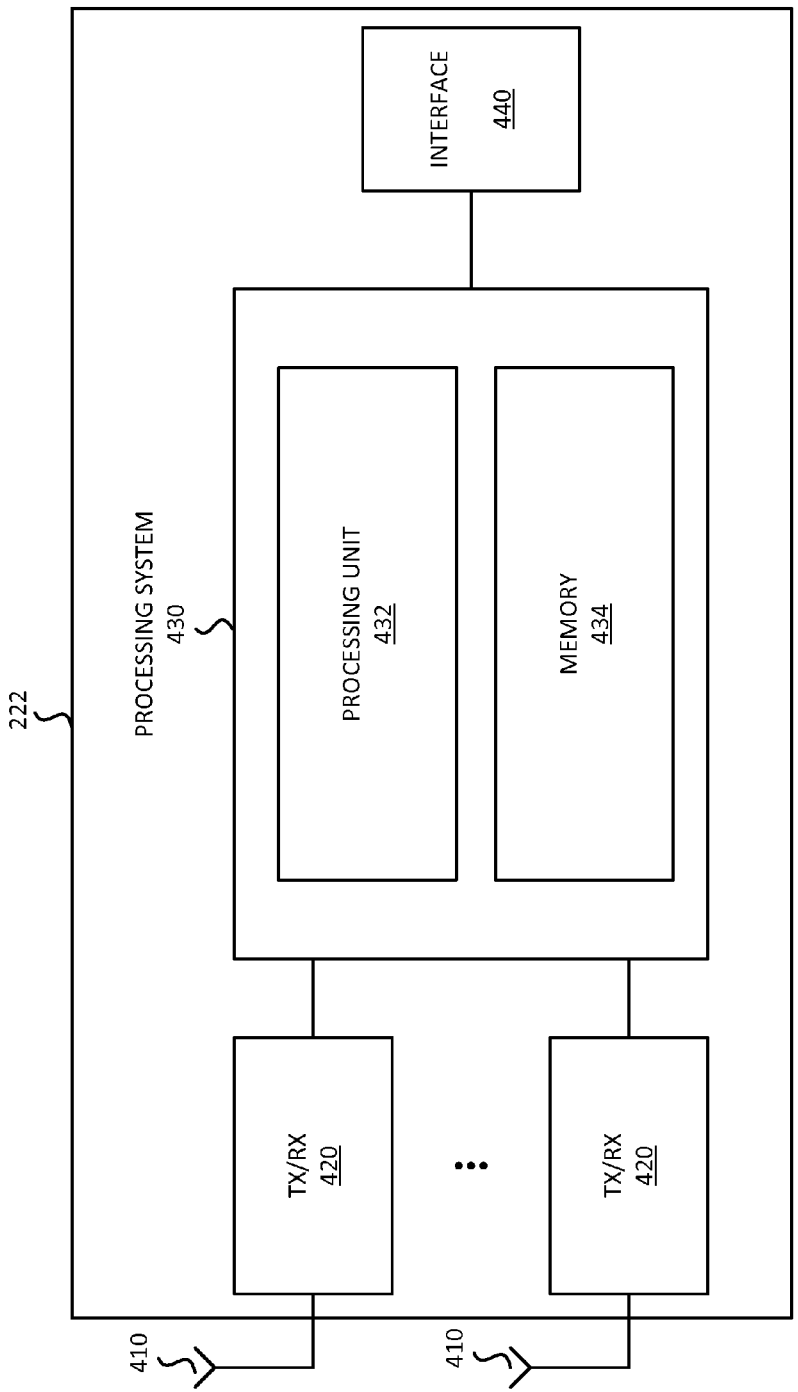
FIG. 4 is a diagram of example components of one or more base stations shown in FIG. 2.

FIG. 4 illustrates a diagram of example components of base station 222. As shown in FIG. 4, base station 222 may include antennas 410, transceivers ("TX/RX") 420, a processing system 430, and an interface 440.

Antennas 410 may include one or more directional and/or omni-directional antennas. Transceivers 220 may be associated with antennas 210 and may include transceiver circuitry for transmitting and/or receiving symbol sequences in a network, such as RAN 220, via antennas 410.

Processing system 430 may control the operation of base station 222. Processing system 430 may also process information received via transceivers 420 and interface 440. Processing system 430 may further measure quality and strength of connection, may determine frame error rate ("FER"), and may transmit this information to radio network controller 224. As illustrated, processing system 430 may include a processing unit 432 and a memory 434.

Processing unit 432 may include one or more processors, microprocessors, ASICs, FPGAs, or the like. Processing unit 432 may process information received via transceivers 420 and interface 440. The processing may include, for example, data conversion, forward error correction, rate adaptation, Wideband Code Division Multiple Access spreading/dispreading, quadrature phase shift keying modulation, etc. In addition, processing unit 432 may generate control messages and/or data messages, and may cause those control messages and/or data messages to be transmitted via transceivers 420 and/or interface 440. Processing unit 432 may also process control messages and/or data messages received from transceivers 420 and/or interface 440.

Memory 434 may include a RAM, a ROM, and/or another type of memory to store data and instructions that may be used by processing unit 432.

Interface 440 may include one or more line cards that allow base station 222 to transmit data to and receive data from radio network controller 224.

As described herein, base station 222 may perform certain operations in response to processing unit 432 executing software instructions of an application stored in a computer-readable medium, such as memory 434. The software instructions may be read into memory 434 from another computer-readable medium or from another device via antennas 410 and/or transceivers 420. The software instructions stored in memory may cause processing unit 432 to perform processes described herein. Alternatively, hardwired circuitry may be used in place of or in combination with software instructions to implement processes described herein. Thus, embodiments described herein are not limited to any specific combination of hardware circuitry and software.

Although FIG. 4 shows example components of base station 222, in other embodiments, base station 222 may include fewer, different, differently arranged, or additional components than depicted in FIG. 4. In still other embodiments, one or more components of base station 222 may perform one or more other tasks described as being performed by one or more other components of base station 222.

Figure 5:
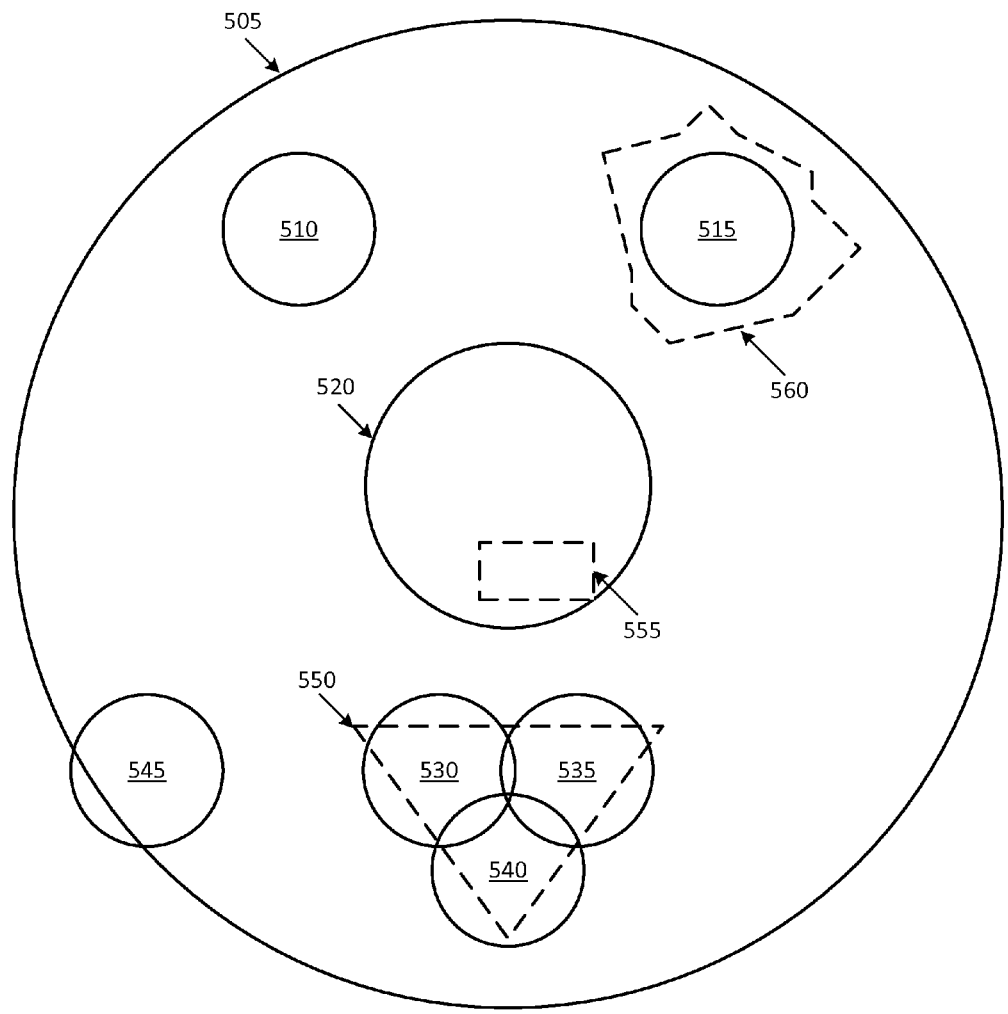
FIG. 5 is a diagram of example coverage areas for cells that communicate with a base station.

FIG. 5 is an example diagram of a coverage area of a set of cells 505, 510, 515, 520, 525, 530, 535, 540, and 545 (hereinafter collectively referred to as "cells 505-545"). FIG. 5 also includes polygons 550, 555, and 560 (hereinafter collectively referred to as "polygons 550-560"). Each one of cells 505-545 may be associated with a single access point (e.g., a single access point 223) and/or a single base station (e.g., base station 222). For example, cell 505 may be associated with one access point 223-1, while cell 510 may be associated with another access point 223-2.

As shown in FIG. 5, cells 505-545 may have different sizes. For example, cell 505 may have an area of several square miles, while cell 530 may only have an area of 100 square feet. The different sizes of cells 505-545 may be caused by several factors. For example, access points 223 associated with one or more cells 505-545 may be associated with a particular band, while access points 223 associated with one or more other cells 505-545 may be associated with a different band. For instance, access point 223, associated with cell 505, may be associated with a particular band (e.g., 700 MHz band), while another access point 223, associated with cell 535, may be associated with a different band (e.g., an AWS band, a 5 GHz band, or any other band).

Another factor that may contribute to different sizes of coverage areas may include geographic/topographic/architectural features, and/or other factors that cause interference and/or affect the transmission of radio waves. For example, buildings, mountains, hills, valleys, etc. may affect the coverage area of a cell.

In the above figure, cell 505 is the largest coverage area. Furthermore, at least a portion of all of the other cells 510-545 fall within cell 505. In this sense, the cell associated with cell 505 may be considered a "macrocell," while the cells associated cells 510-545 may be considered "microcells." Additionally, cell 505 may be considered a macrocell, in that cell 505 may be associated with a particular base station 222. As discussed above, while a macrocell typically provides larger coverage than microcells, microcells typically provide higher bandwidth than macrocells.

Coverage areas may also be conceptually grouped (e.g., into a group defined by polygon 550). A coverage area polygon, such as polygon 550 and/or polygon 555, may be a conceptual representation that encompasses at least a portion of one or more of cells 505-545. For example, polygon 550 roughly encompasses cells 530, 535, and 540. As can be seen from FIG. 5, a portion of polygon 550 may fall outside of cells 530, 535, and 540. As also can be seen from FIG. 5, portions of cells 530, 535, and 540 may also fall outside of polygon 550.

As also shown in FIG. 5, polygons 550-560 may fall completely within one or more cells 505-545. For example, polygon 555 falls completely within cell 520, while a portion of cell 520 falls outside of polygon 555. As further shown in FIG. 5, cells 505-545 may fall completely within one or more polygons 550-560. For example, cell 515 falls completely within polygon 560, while a portion of polygon 560 falls outside of cell 515.

Polygons 550-560 may be determined (e.g., by an administrator) based on several factors. For example, it may be observed that actual coverage areas are different than expected coverage areas. For instance, while cell 520 may be expected to cover a circle with a radius of one mile, it may be observed that the actual coverage of the cell is smaller (e.g., a 100-meter by 500-meter rectangle). On the other hand, the observed actual coverage area of a cell may be larger than expected. For instance, while cell 515 may be expected to cover a circle with a radius of 100 meter, it may be observed that the actual coverage area of the cell may be described by an irregular polygon (e.g., polygon 560).

Furthermore, when several cells are grouped together (e.g., have overlapping coverage areas), it may be more efficient (e.g., may save space in a data structure that describes the coverage areas and/or polygons, may be easier for a system administrator to define, etc.) to describe the group of cells in terms of polygons. For example, cells 530, 535, and 540 are close together, and have overlapping coverage. In such an example, polygon 550 may be used as an approximation that collectively describes cells 530, 535, and 540. While certain example shapes and sizes are shown for cells 505-545 and polygons 550-560, any shapes and sizes may be implemented in practice.

FIG. 6 is an example data structure 600 that may be used to assist user devices 110 to connect to cells of a RAN. Data structure 600 may be stored in a memory device (e.g., RAM, ROM, hard disk, etc.) associated with one or more devices shown in FIG. 2. For example, data structure 600 may be stored by user device 110, base station 222, etc. Each conceptual row of data structure 600 may correspond to a particular access point 223.

Data structure 600 may include a collection of fields, such as a technology field 605, cell identifier ("ID") field 610, location field 615, radius/shape field 620, altitude field 625, and a band field 630. Data structure 600 includes fields 605-630 for explanatory purposes. In practice, data structure 600 may include additional fields, fewer fields, different fields, or differently arranged fields than are described with respect to data structure 600.

Technology field 610 may identify a technology employed by access point 223. For example, technology field 610 may identify whether access point 223 employs an LTE technology, a "Wi-fi" technology (e.g., IEEE 802.11a/b/g/n, etc.), an Evolution Data Optimized ("EVDO") technology, CDMA2000 1x ("1x"), etc. Cell ID field 610 may include an identifier that identifies access point 223. Location field 615 may include a location of access point 223. The location may be stored as a set of latitude/longitude coordinates, or any other type of geographic location identifier.

Radius/shape field 620 may aid in identifying a coverage area of access point 223 (e.g., identifying a radius or shape of a cell associated with access point 223). For example, radius/shape field 620 may identify a shape of the cell as a circle with a radius of three miles. The midpoint of the circle may be the location specified in location field 615. In another example, instead of identifying the shape as a circle and identifying the radius, radius/shape field 620 may merely identify the radius, from which it can be inferred that the shape of the cell is a circle.

Radius/shape field 620 may also identify any other shape, such as a triangle, rectangle, or any other polygon, as describing the coverage area of the cell. For example, radius/shape field 620 may identify the shape of the polygon, and provide geographic coordinates (e.g., latitude and longitude) of the vertices, or endpoints, of the polygon. Additionally, or alternatively, radius/shape field 620 may identify the vertices of the polygon as vectors, with a reference point of the location stored in location field 615. Additionally, or alternatively, radius/shape field 620 may identify the vertices of the polygon as a series of vectors, with the endpoint of one vector being the starting point of the subsequent vector in the series.

Altitude field 625 may identify an altitude (e.g., an altitude of access point 223). The altitude may be measured from any arbitrary reference location, such as sea level. Band field 630 may identify a band associated with access point 223. For example, band field 630 may identify an entire band (e.g., a 700 MHz band, a 900 MHz band, an AWS band, a 1900 MHz band, etc.), or any subset(s) of a band (such as a frequency range or a single frequency).

As mentioned above, data structure 600 may include additional fields, fewer fields, different fields, or differently arranged fields than are described with respect to data structure 600. For example, location field 615 and altitude field 625 may not be needed to describe a coverage area of a cell, and/or may be merged into radius/shape field 620. For instance, radius/shape field 620 may specify four three-dimensional coordinates (e.g., latitude, longitude, and altitude). In such an example, the specified cell would be a four-sided polygon with the coordinates specified in radius/shape field 620.

Furthermore, while an example is described where a polygon represents the coverage area of a single cell, it may be understood that a polygon may represent the coverage area of multiple cells. In such an example, entries for multiple cells may specify a polygon that encompasses the same coverage area. Additionally, or alternatively, location field 615 and altitude field 625 may be merged into a single field that includes three-dimensional coordinates (e.g., latitude, longitude, and altitude).

Figure 7:
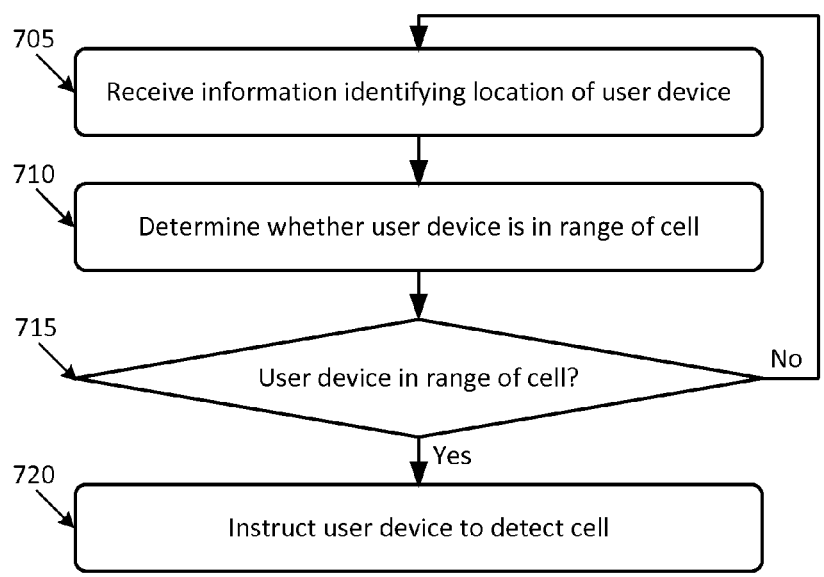
FIG. 7 is a diagram of an example process for instructing a user device to detect a cell when the user device is in range of the cell.
Figure 8:
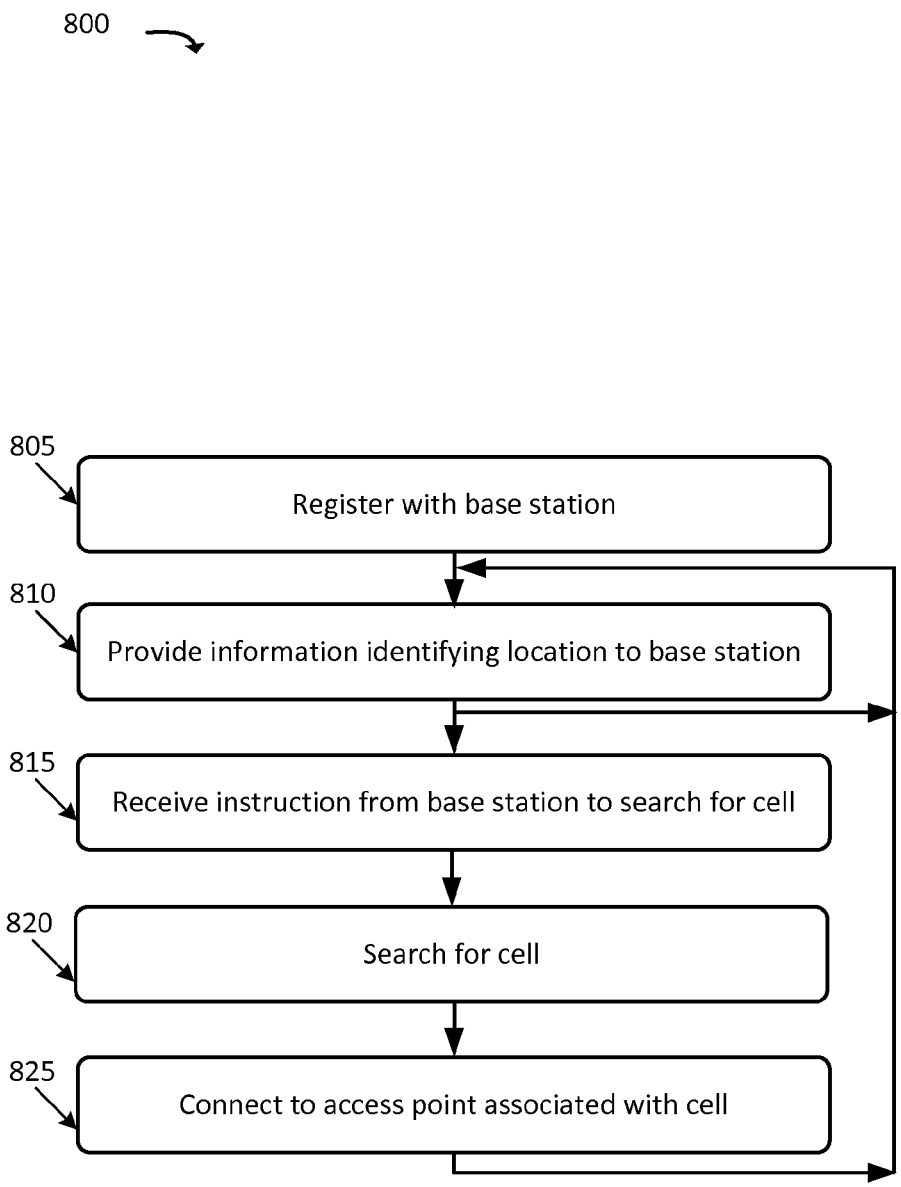
FIG. 8 is a diagram of an example process for receiving an instruction to detect a cell when a user device is in range of the cell.

FIGS. 7 and 8 illustrate example processes 700 and 800 for a network-initiated cell search. Through processes 700 and/or 800, a user device (e.g., user device 110) may continuously provide its information to a base station (e.g., base station 222), and receive an instruction from base station 222 when base station 222 determines that user device 110 has entered a microcell associated with base station 222 (e.g., a microcell associated with an access point 223 that is connected to base station 222).

FIG. 7 illustrates an example process 700 for instructing a user device to detect a cell when the user device is in range of the cell. In one example implementation, process 700 may be performed by base station 222. In another example implementation, some or all of process 700 may be performed by a device or collection of devices separate from, or in combination with, base station 222.

Process 700 may include receiving information identifying a location of a user device (block 705). For example, base station 222 may receive information identifying a geographic location of user device 110. User device 110 may be located within a macrocell, associated with base station 222, and user device 110 may be wirelessly connected to base station 222. User device 110 may communicate with base station 222 by wirelessly sending and/or receiving signals to/from base station 222.

Information identifying the location of user device 110 may be received as a periodic location update provided by user device 110. The information identifying the location may include a two-dimensional set of coordinates (e.g., a longitude and a latitude), at which user device 110 is located. Additionally, or alternatively, the information identifying the location may indicate a height (e.g., an altitude above sea level), at which user device 110 is located. The location may be determined by user device 110 via, for example, triangulation, a global positioning system ("GPS"), an altimeter, a location input by a user of user device 110, or the like. Additionally, or alternatively, the location may be determined by base station 222 via, for example, triangulation, a global positioning system ("GPS"), or the like.

Process 700 may also include determining whether the user device is in range of a cell (block 710). For example, base station 222 may determine whether user device 110 is in range of a particular microcell that is associated with base station 222 (e.g., whether user device 110 is within a microcell associated with base station 222, whether user device 110 is within a particular distance away from the microcell, etc.).

In order to determine whether user device 110 is in range of the microcell, base station 222 may compare the location of user device 110 to a known coverage area of the microcell. The known coverage area may be indicated by information stored in a memory device associated with base station 222. In other words, base station 222 may store some or all of the example information described above with respect to data structure 400. Specifically, for example, base station 222 may store information that indicates a coverage area of the microcell (e.g., a location of the microcell, a radius of the coverage area of the microcell, a polygon that defines an area in which the microcell is located, etc., as specified by one or more of fields 615, 620, and/or 625).

If user device 110 is within the coverage area of a particular microcell, base station 222 may determine that user device 110 is in range of the particular microcell. Base station 222 may further identify the microcell(s), of within which user device 110 is in range. Base station 222 may further forego identifying that user device 110 is within range of a particular cell until user device 110 has satisfied additional condition(s) (e.g., whether user device 110 has been within range of the particular cell for a predetermined period of time, whether user device 110 is at least a predetermined distance from an outside edge of the coverage area of the cell(s), whether user device 110 is within a predetermined distance from an outside edge of the coverage area of the cell(s), etc.).

If user device 110 is not in range of any cells associated with base station 222 (block 715—NO), process 700 may return to block 705. That is, base station 222 may continue to receive location updates from user device 110, and iteratively repeat blocks 705-715 until user device 110 is in range of a cell.

If user device 110 is in range of a cell associated with base station 222 (block 715—YES), process 700 may include instructing user device 110 to detect the cell (block 720). When instructing user device 110 to detect the microcell, base station 222 may provide further information regarding the microcell. This additional information may identify the technology used by the microcell, a frequency range (e.g., a band) associated with the microcell, etc. For example, if base station 222 identifies that user device 110 is in range of a microcell that employs Wi-fi technology, in a 5 GHz band, base station 222 may send an instruction to user device 110 to search for the microcell that employs Wi-fi technology, in the 5 GHz band.

FIG. 8 illustrates an example process 800 for receiving an instruction to detect a cell when a user device is in range of the cell. In one example implementation, process 800 may be performed by user device 110. In another example implementation, some or all of process 800 may be performed by a device or collection of devices separate from, or in combination with, user device 110.

As shown in FIG. 8, process 800 may include registering with a base station (block 805). For instance, user device 110 may register with base station 222. Registration may include sending and/or receiving authentication information to and/or from base station 222, etc. Registering may also coincide with user device 110 connecting to a cell (e.g., a macrocell) associated with base station 222.

Process 800 may further include providing information regarding a location to the base station (block 810). For example, user device 110 may determine its geogrraphic location, and provide information identifying its location to base station 222. As discussed above, user device 110 may periodically determine its location, and periodically send location updates to base station 222. User device 110 may determine its location via one or more of a variety of techniques, such as through triangulation, GPS tracking, receiving user input, etc.

In one implementation, as discussed above with respect to FIG. 7, base station 222 may determine a location of user device 110. This determining may be in addition to, or in lieu of, user device 110 providing information regarding its location to base station 222. In an example implementation where user device 110 does not provide information regarding its location to base station 222 (e.g., where base station 222 determines a location of user device 110 without receiving the information regarding the location from user device 110), block 810 may be omitted.

As further shown in FIG. 8, process 800 may further include receiving an instruction from the base station to search for a cell (block 815). For example, user device 110 may receive an instruction from base station 222 to search for a microcell. As discussed above with respect to FIG. 7, the instruction received from base station 222 may be an instruction to search for a microcell, which may be within a macrocell to which user device 110 is already connected. The instruction may also include information identifying the microcell (e.g., a technology employed by the microcell, a band at which the microcell operates, etc.).

Process 800 may further include searching for the cell (block 820). For example, user device 110 may search for a microcell identified by the instruction received at block 815. When searching for the microcell, user device 110 may periodically send messages (e.g., beacons) according to a band and/or technology associated with the microcell. In order to do so, user device 110 may activate (e.g., switch from a low-power, no-power, and/or "off" state to a powered, or "on" state) one or more radio transceivers that operate at a frequency band, and/or employ the technology identified by the instruction. For example, if the instruction indicates a microcell that uses Wi-Fi technology, and operates a 1900 MHz band, user device 110 may activate a radio transceiver that uses Wi-Fi technology, and operates in the 1900 MHz band.

The radio transceiver of user device 110, activated at block 820, may have previously been in an "off" mode (e.g., a low-power or a no-power state). By being in the "off" mode prior to being activated at block 820, user device 110 may save power that would have been consumed by the radio transceiver being in an "on" mode (e.g., actively searching for cells).

Process 800 may further include connecting to an access point associated with the cell (block 825). For example, user device 110 may connect to access point 223 associated with the microcell that was identified in the instruction from base station 222. Upon connecting to access point 223, user device 110 may further inform base station 222 that user device 110 has connected to access point 223.

Figure 9:
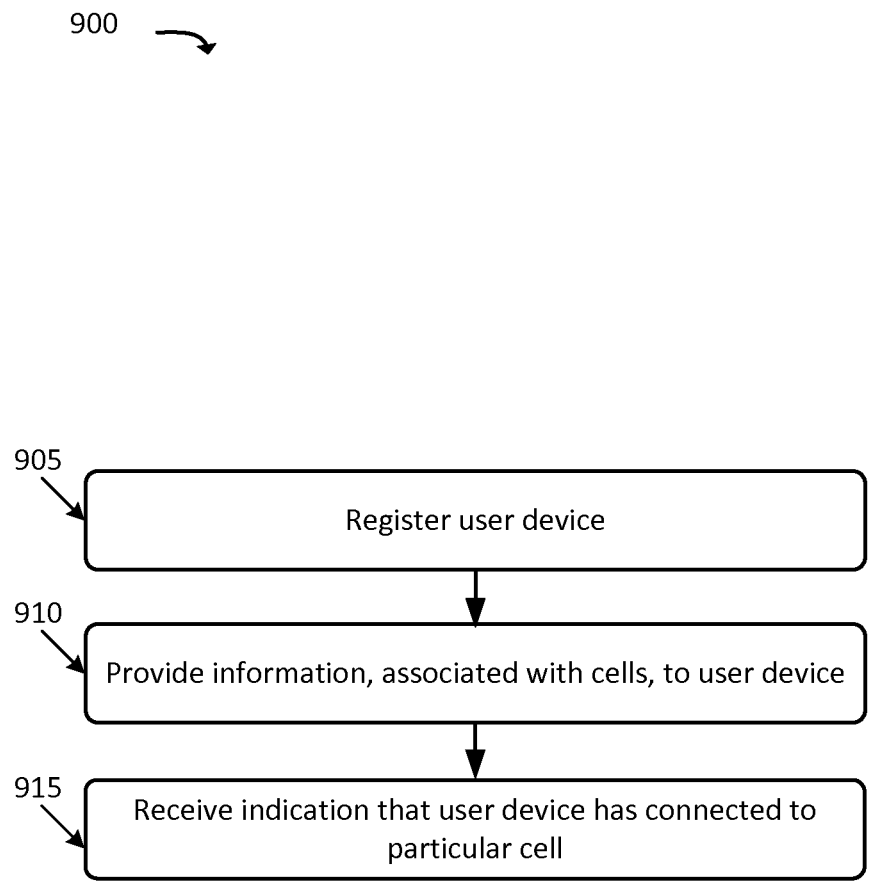
FIG. 9 is a diagram of an example process for assisting a user device in connecting to a cell associated with a base station.
Figure 10:
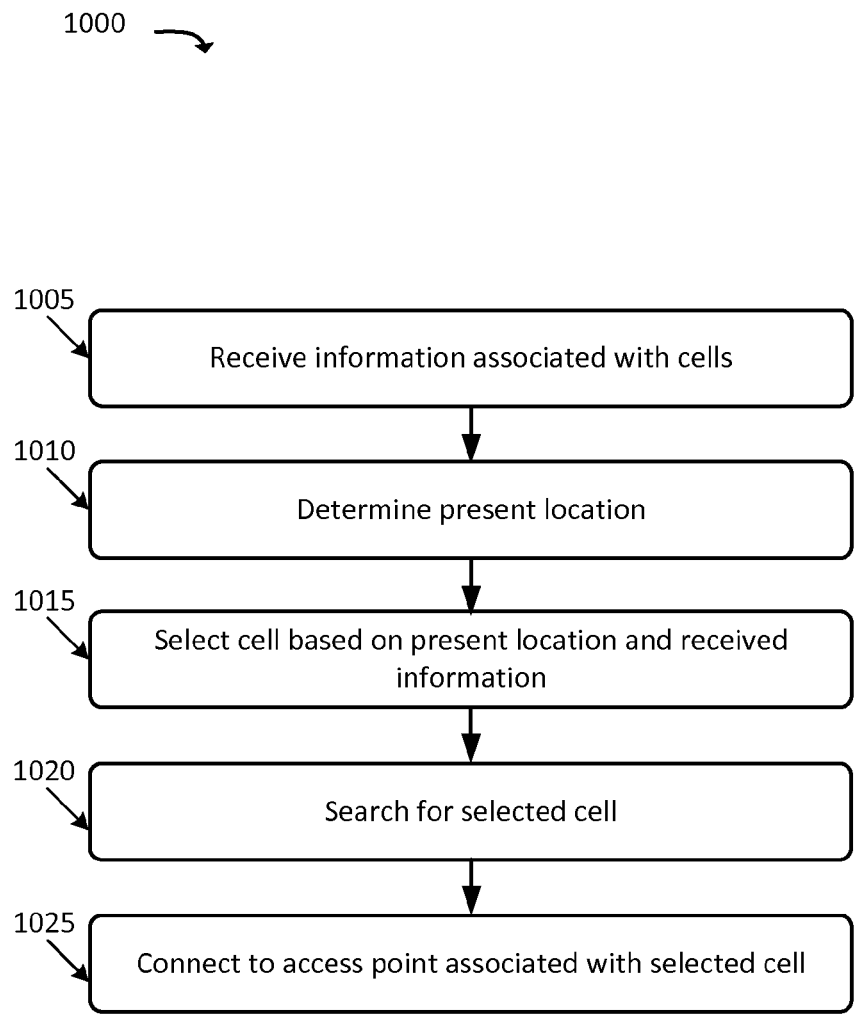
FIG. 10 is a diagram of an example process for connecting to a cell based on received information that identifies cells and their locations.

FIGS. 9 and 10 illustrate example processes 900 and 1000 for a network-assisted cell search. For example, through processes 900 and/or 1000, a user device (e.g., user device 110) may store information regarding cells, and connect to cells (e.g., microcells) using the stored information. In such an example, user device 110 may not need to periodically send its geographic location to base station 222 in order to detect microcells associated with base station 222.

FIG. 9 is an example process 900 for assisting a user device in connecting to an access point associated with a microcell. In one example implementation, process 900 may be performed by base station 222. In another example implementation, some or all of process 900 may be performed by a device or collection of devices separate from, or in combination with, base station 222.

As shown in FIG. 9, process 900 may include registering a user device (block 905). For example, base station 222 may register user device 110, upon user device 110 connecting to base station 222. Process 900 may further include providing information, associated with cells, to the user device (block 910). For example, base station 222 may send information identifying microcells, associated with base station 222, to user device 110. The information may include some or all of the information stored in data structure 600 (shown in FIG. 6). For example, the information may identify one or more microcells associated with base station 222, as well as their associated coverage area(s), technology/technologies, and/or bands/frequency ranges. Base station 222 may provide the information to user device 222 upon user device 110 entering a macrocell associated with base station 222, and/or upon user device 110 registering with base station 222.

Process 900 may further include receiving an indication that a user device has connected to a particular cell (block 915). For example, base station 222 may receive an indication that user device 110 has connected to a particular cell (e.g., a microcell), that was identified in the information provided (at block 910) to user device 110. The indication may be received by base station 222 from user device 110. Upon receiving the indication that user device 110 has connected to the microcell, base station 222 may perform certain functions (handover functions from another cell to the microcell, etc.).

FIG. 10 illustrates an example process 1000 for connecting to a cell based on received information that identifies cells and their locations. In one example implementation, process 1000 may be performed by user device 110. In another example implementation, some or all of process 1000 may be performed by a device or collection of devices separate from, or in combination with, user device 110.

As shown in FIG. 10, process 1000 may include receiving information associated with cells (block 1005). For example, user device 110 may receive information identifying one or more cells (e.g., microcells) associated with a base station (e.g., base station 222), with which user device 110 is registered and/or is in active communication. The received information may include some or all of the information included in data structure 600 (shown in FIG. 6). For example, the received information may identify one or more cells associated with base station 222, as well as their associated coverage area(s), technology/technologies, and/or bands/frequency ranges.

Process 1000 may further include determining a present location of a user device (block 1010). For example, user device 110 may determine its present geographic location. User device 110 may determine its present location using any suitable technique, such as via triangulation, GPS, received user input, etc. Additionally, or alternatively, user device 110 may receive information from base station 222 that identifies the location of user device 110.

Process 1000 may further include selecting a cell based on a user device's present location and the received information (block 1015). For instance, user device 110 may compare the present location (determined at block 1010) of user device 110 to information received at block 1005. User device 110 may, for example, compare the present location of user device 110 to coverage areas of one or more cells (e.g., microcells) identified in the received information.

If user device 110 is in range of a particular cell (e.g., within the particular cell, within a predetermined distance from an outside of edge of the particular cell, etc.) identified in the received information, user device 110 may select the particular cell. If user device 110 is in range of multiple cells, user device 110 may select one of the multiple cells based on any of a number of criteria.

For example, user device 110 may select a cell that is closest to user device 110, out of the multiple cells. Additionally, or alternatively, user device 110 may select a cell based on a technology and/or band associated with a cell. For example, user device 110 may prefer a cell that operates at a higher band than another cell. Furthermore, the information, received from base station 222 may indicate a priority of cells. User device 110 may select a cell, out of multiple cells of which user device 110 is in range, based on this priority.

Process 1000 may further include searching for the selected cell (block 1020). For example, user device 110 may search for the cell that was selected at block 1015. When searching for the cell, user device may send periodic messages (e.g., beacons) according to the frequency band and/or technology associated with the cell. In order to search for the cell, user device may activate one or more radio transceivers that operate at a frequency band, and/or employ the technology associated with the cell. For example, if the selected cell uses Wi-Fi technology, and operates a 1900 MHz band, user device 110 may activate a radio transceiver that uses Wi-Fi technology, and operates at the 1900 MHz band.

The radio transceiver of user device 110, activated at block 1020, may have previously been in an "off" mode (e.g., a low-power or a no-power state). By being in the "off" mode prior to being activated at block 1020, user device 110 may save power that would have been consumed by the radio transceiver being in an "on" mode (e.g., actively searching for cells).

Process 1000 may further include connecting to an access point associated with the selected cell (block 1025). For example, user device 110 may connect to access point 223, associated with the cell that was selected at block 1015. Upon connecting to access point 223, user device 110 may inform base station 222 that user device 110 has connected to access point 223, (e.g., user device 110 may send a message to base station 222 that identifies the cell to which user device 110 has connected).

By storing information regarding microcells associated with a base station, a user device may determine when to search for the microcells. The user device may, in one example implementation described above, forego periodically sending location information to the base station. In another example implementation, the user device may send location information to the base station at a configurable interval (e.g., an interval that is longer than an interval defined by a cellular standard), as the user device itself is able to determine when to connect to microcells associated with the base station. Furthermore, the user device is able to quickly determine when to search for a microcell (e.g., the user device may determine, every one second, whether to search for a microcell, while the user device may periodically send its location to the base station every ten seconds).

The device(s) and processes described above allow a user device to detect microcells, associated with a base station, in a manner that saves power consumption by the user device. The user device is able to save power by disabling radio transceivers associated with certain technologies and/or bands when the user device is not in range of cells that operate according to those technologies and/or bands. Furthermore, an implementation described above reduces interference that would be caused by numerous wireless transceivers continuously searching for cells that correspond to numerous technologies and/or bands.

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 7-10, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a network device of a telecommunications network, the method:
   storing, by the network device, information identifying a coverage area associated with each of one or more cells that are associated with the network device;
   receiving, by the network device, information identifying a geographic location of a user device;
   comparing, by the network device, the geographic location of the user device to one or more of the stored coverage areas;
   determining, by the network device and based on the comparing, that the user device is within a particular coverage area of a particular cell, of the one or more cells;
   storing information that identifies at least one of a wireless technology or a band associated with the particular cell; and
   sending, by the network device and to the user device, and based on determining that the user device is located within the particular coverage area of the particular cell, an instruction for the user device to connect to the particular cell, where the user device is to attempt to connect to the particular cell in response to the instruction,
   where sending the instruction to connect to the particular cell includes:
      sending information, that identifies the at least one of the wireless technology or the band, to the user device.

2. The method of claim 1, where the instruction, sent to the user device, causes the user device to search for the particular cell.

3. The method of claim 1, where the information identifying the coverage area of the particular cell defines a three-dimensional space.

4. The method of claim 1, where the particular coverage area is located within a coverage area of a cell to which the user device is connected, before the network device sends the instruction to the user device.

5. A method, performed by a network device of a telecommunications network, the method comprising:
   storing, by the network device, information identifying a coverage area associated with each of one or more cells that are associated with the network device, where the information identifying a coverage area associated with each of one or more cells that are associated with the network device includes:
      information identifying a coverage area associated with two or more cells that are associated with the network device, where the information identifying the coverage area associated with the two or more cells includes a two-dimensional or three-dimensional polygon that includes coverage areas associated with each of the two or more cells;
   receiving, by the network device, information identifying a geographic location of a user device;
   comparing, by the network device, the geographic location of the user device to one or more of the stored coverage areas;
   determining, by the network device and based on the comparing, that the user device is within a particular coverage area of a particular cell, of the one or more cells;
   sending, by the network device and to the user device, and based on determining that the user device is located within the particular coverage area of the particular cell, an instruction for the user device to connect to the particular cell, where the user device is to attempt to connect to the particular cell in response to the instruction.

6. A method, performed by a user device in communication with a telecommunications network, the method comprising:
   storing, by the user device, information identifying a coverage area associated with each of one or more cells that are associated with the telecommunications network;
   determining, by the user device, a geographic location of the user device;
   comparing, by the user device, the geographic location of the user device to one or more of the stored coverage areas;
   determining, by the user device, that the user device is within a particular coverage area of a particular cell, of the one or more cells;
   determining, based on stored information, at least one of the technology or the band associated with the particular cell;
   activating a radio transceiver, associated with the user device, upon determining that the user device is within the particular coverage area of the particular cell, where the radio transceiver is one of a plurality of radio transceivers included in the user device, where activating the radio transceiver includes:
      selecting the radio transceiver, from the plurality of radio transceivers based on the radio transceiver being associated with at least one of a technology or a band associated with the particular cell; and
   connecting, by the user device and in response to determining that the user device is within the particular coverage area of the particular cell, of the particular cell, to the particular cell, where connecting to the particular cell includes:
      using the radio transceiver to transmit signals for connecting to the particular cell.

7. The method of claim 6, further comprising:
   registering with a base station of the telecommunications network; and
   receiving, from the base station, the information identifying the coverage area associated with the each of the one or more cells upon registering with the base station.

8. The method of claim 7, where the each of the one or more cells is associated with the base station.

9. The method of claim 6, where the information identifies one or more of a band or a wireless technology associated with at least one of the one or more cells.

10. The method of claim 6, where the radio transceiver is not activated before determining that the user device is within the particular coverage area of the particular cell.

11. The method of claim 6, where activating the radio transceiver includes:

switching the radio transceiver from a no-power or a low-power state to an on state, where the on state consumes more power than the low-power and the no-power states.

12. A non-transitory computer-readable medium, comprising:
a plurality of instructions, which, when executed by a processor, cause the processor to:
receive a location of a user device;
compare the location of the user device to one or more coverage areas associated with each of one or more cells;
determine that the user device is within a particular coverage area of a particular cell, of the one or more cells;
store information that identifies at least one of a wireless technology or a band associated with the particular cell; and
instruct the user device, based on determining that the user device is within the particular coverage area of the particular cell, to connect to the particular cell,
where the one or more instructions to instruct the user device to connect to the particular cell include:
one or more instructions to provide an identification of the at least one of the wireless technology or the band to the user device.

13. The non-transitory computer-readable medium of claim 12, where the instruction to connect to the particular cell causes the user device to search for the particular cell, where user device does not search for the particular cell until the user device is instructed to search for the particular cell.

14. The non-transitory computer-readable medium of claim 12, where a particular coverage area is defined as a two-dimensional or a three-dimensional polygon.

15. A non-transitory computer-readable medium, comprising:
a plurality of instructions, which, when executed by a processor, cause the processor to:
receive a location of a user device;
compare the location of the user device to one or more coverage areas associated with each of one or more cells, where a particular coverage area is defined as a two-dimensional or a three-dimensional polygon;
determine that the user device is within a particular coverage area of a particular cell, of the one or more cells, where the polygon corresponds to coverage areas of two or more cells, of the one or more cells; and
instruct the user device, based on determining that the user device is within the particular coverage area of the particular cell, to connect to the particular cell.

16. The non-transitory computer-readable medium of claim 15, where the instruction to connect to the particular cell causes the user device to search for the particular cell, where user device does not search for the particular cell until the user device is instructed to search for the particular cell.

17. The method of claim 5, where the instruction, sent to the user device, causes the user device to search for the particular cell.

18. The method of claim 5, where the information identifying the coverage area of the particular cell defines a three-dimensional space.

19. The method of claim 5, where the particular coverage area is located within a coverage area of a cell to which the user device is connected, before the network device sends the instruction to the user device.

* * * * *

UNITED STATES PATENT AND TRADEMARK OFFICE
CERTIFICATE OF CORRECTION

| | | |
|---|---|---|
| PATENT NO. | : 8,472,950 B2 | Page 1 of 1 |
| APPLICATION NO. | : 13/289588 | |
| DATED | : June 25, 2013 | |
| INVENTOR(S) | : Derek Hongwei H. Bao et al. | |

It is certified that error appears in the above-identified patent and that said Letters Patent is hereby corrected as shown below:

In the Claims
In Claim 1, column 15, line 18, insert the word --comprising-- between the word method and the punctuation symbol ":".

Signed and Sealed this
Eighteenth Day of February, 2014

Michelle K. Lee
*Deputy Director of the United States Patent and Trademark Office*